(12) United States Patent
Liang et al.

(10) Patent No.: US 9,908,417 B2
(45) Date of Patent: Mar. 6, 2018

(54) SYSTEM AND METHOD FOR CONTROLLING REGENERATIVE BRAKING IN A VEHICLE

(71) Applicant: FORD GLOBAL TECHNOLOGIES, LLC, Dearborn, MI (US)

(72) Inventors: Wei Liang, Farmington Hills, MI (US); Yanan Zhao, Ann Arbor, MI (US); Xiaoyong Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 14/666,454

(22) Filed: Mar. 24, 2015

(65) Prior Publication Data
US 2016/0280074 A1 Sep. 29, 2016

(51) Int. Cl.
| | | |
|---|---|---|
| B60L 11/00 | (2006.01) | |
| B60L 7/18 | (2006.01) | |
| B60L 7/16 | (2006.01) | |
| B60W 10/02 | (2006.01) | |
| B60K 6/48 | (2007.10) | |

(52) U.S. Cl.
CPC ............ *B60L 7/18* (2013.01); *B60L 7/16* (2013.01); *B60K 6/48* (2013.01); *B60L 11/00* (2013.01); *B60W 10/02* (2013.01); *Y02T 10/7275* (2013.01)

(58) Field of Classification Search
CPC ...... B60L 11/00; B60W 10/06; B60W 10/196
USPC ...................... 701/103, 22, 54, 70
See application file for complete search history.

(56) References Cited

U.S. PATENT DOCUMENTS

| | | | | |
|---|---|---|---|---|
| 4,270,806 A | * | 6/1981 | Venkataperumal | ... B60T 13/586 188/159 |
| 6,070,680 A | * | 6/2000 | Oyama | ..................... B60K 6/48 180/65.25 |
| 6,376,927 B1 | * | 4/2002 | Tamai | ..................... B60K 6/383 290/31 |
| 6,459,980 B1 | * | 10/2002 | Tabata | ..................... B60K 6/46 180/65.1 |
| 8,066,339 B2 | * | 11/2011 | Crombez | ................... B60L 7/18 303/152 |
| 8,135,526 B2 | * | 3/2012 | Minarcin | ............... B60W 10/02 180/65.285 |
| 8,712,616 B2 | * | 4/2014 | Treharne | .................. B60L 1/003 180/65.265 |
| 8,744,712 B2 | * | 6/2014 | Tashiro | ..................... B60L 7/18 303/152 |
| 9,026,296 B1 | * | 5/2015 | Johri | ..................... B60W 20/10 701/22 |
| 9,327,722 B1 | * | 5/2016 | Johri | ..................... B60W 20/50 |
| 2002/0180266 A1 | * | 12/2002 | Hara | ......................... B60K 6/44 303/152 |
| 2003/0080614 A1 | * | 5/2003 | Soga | ......................... B60K 6/44 303/152 |

(Continued)

*Primary Examiner* — Thomas G Black
*Assistant Examiner* — Wae L Louie
(74) *Attorney, Agent, or Firm* — David B. Kelley; Brooks Kushman P.C.

(57) ABSTRACT

A system and method for controlling regenerative braking in a vehicle having an electric motor and a torque-converter clutch may include the step of implementing a regenerative-braking torque request based at least in part on a speed of the motor and a slip of the torque-converter clutch. A motor torque command based at least in part on a deceleration of the motor may be sent to and used to control the motor.

25 Claims, 3 Drawing Sheets

(56) References Cited

U.S. PATENT DOCUMENTS

| | | | |
|---|---|---|---|
| 2006/0142115 A1* | 6/2006 | Senda | B60W 10/02 477/6 |
| 2011/0112734 A1* | 5/2011 | Whitney | B60W 30/20 701/54 |
| 2011/0257854 A1* | 10/2011 | Whitney | F02D 29/02 701/54 |
| 2012/0234123 A1* | 9/2012 | Whitney | F16H 61/143 74/473.1 |
| 2012/0265382 A1 | 10/2012 | Nefcy et al. | |
| 2013/0080031 A1* | 3/2013 | Knoebel | F02D 41/123 701/103 |
| 2013/0296102 A1* | 11/2013 | Banker | B60W 10/196 477/4 |
| 2013/0296128 A1* | 11/2013 | Nefcy | F16D 48/02 477/5 |
| 2014/0324263 A1* | 10/2014 | Tabata | B60K 6/442 701/22 |
| 2015/0051808 A1* | 2/2015 | Keller | F02D 41/0215 701/102 |
| 2015/0202964 A1* | 7/2015 | Nefcy | B60L 7/18 701/70 |
| 2015/0202965 A1* | 7/2015 | Gabor | B60L 7/18 701/70 |
| 2015/0203106 A1* | 7/2015 | Zhao | B60L 7/18 701/22 |
| 2015/0251657 A1* | 9/2015 | Johri | B60L 7/10 701/22 |
| 2015/0360691 A1* | 12/2015 | Nefcy | B60W 30/18127 701/22 |
| 2016/0096446 A1* | 4/2016 | Yamazaki | B60L 15/2081 477/20 |
| 2016/0280074 A1* | 9/2016 | Liang | B60L 7/18 |

\* cited by examiner

SYSTEM AND METHOD FOR CONTROLLING REGENERATIVE BRAKING IN A VEHICLE

TECHNICAL FIELD

The present disclosure relates to a system and method for controlling regenerative braking in a vehicle.

BACKGROUND

Electric vehicles, hybrid electric vehicles (HEV's), plug-in hybrid electric vehicles (PHEV's) and indeed others vehicles that utilize an electric machine, such as an electric motor, may be configured to use the electric machine to provide regenerative braking to at least assist in stopping the vehicle. Regenerative braking may provide a number of advantages over using a friction braking system exclusively. For example, the use of regenerative braking, whereby an electric motor provides negative torque to the vehicle wheels, reduces wear on the friction elements of the friction braking system. In addition, during regenerative braking, the motor may function as a generator, producing electricity that may be used immediately, or stored in a storage device, such as a battery.

Because of the advantages associated with regenerative braking, some regenerative braking control systems may attempt to apply the maximum regenerative braking torque so that overall vehicle efficiencies are maximized. It may be desirable to avoid this strategy, however, if the speed of the motor could go below a minimum desired threshold. This may be of particular importance in a powertrain having a torque-converter clutch, which, when open or slipping, could contribute to the motor speed going below the desired threshold.

SUMMARY

At least some embodiments of the present invention include a method for controlling regenerative braking in a vehicle having an electric motor and a torque-converter clutch. The method includes the steps of implementing a regenerative-braking torque request based at least in part on a speed of the motor and a slip of the torque-converter clutch, and sending to the motor a motor torque command based at least in part on a deceleration of the motor.

At least some embodiments of the present invention include a method for controlling regenerative braking in a vehicle having an electric motor and a torque-converter clutch. The method includes reducing regenerative braking to zero when a speed of the motor is below a first predetermined speed and a slip of the torque-converter clutch is more than a predetermined slip. The method also includes controlling a torque of the motor based at least in part on a deceleration of the motor.

At least some embodiments of the present invention include a system for controlling regenerative braking in a vehicle having an electric motor and a torque-converter clutch. The system includes a control system including at least one controller configured to control regenerative braking based at least in part on a speed of the motor and a slip of the torque-converter clutch. The controller is also configured to control a torque of the motor based at least in part on a deceleration of the motor.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
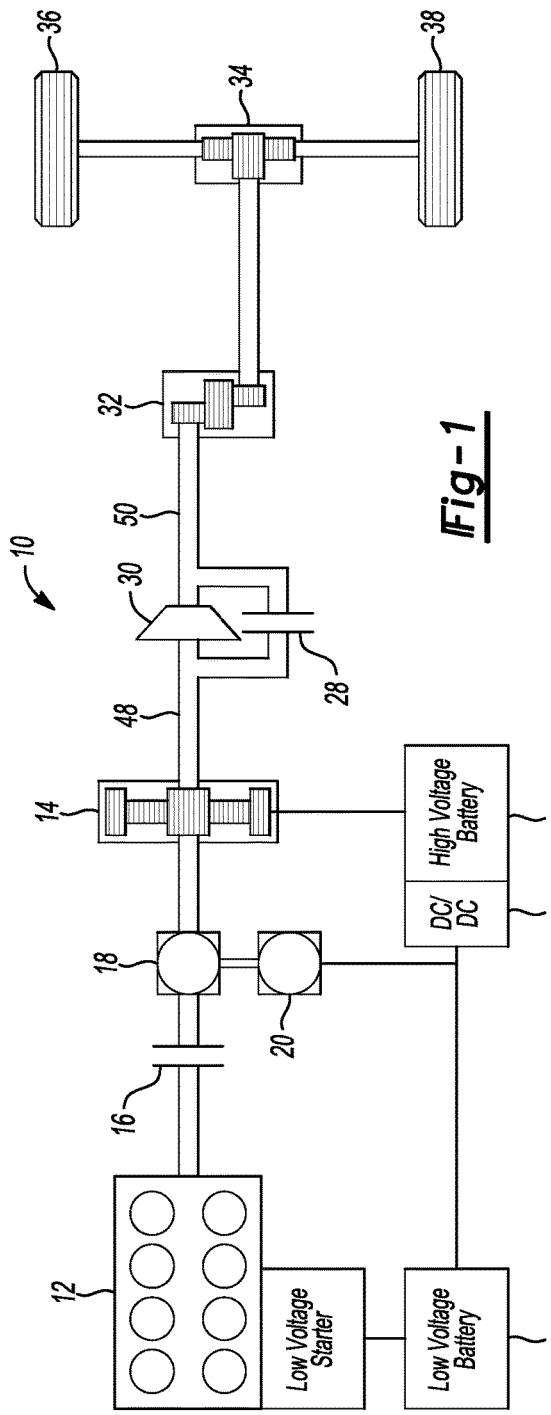
FIG. 1 is a schematic representation of a portion of a hybrid electric vehicle having a control system capable of implementing a method in accordance with embodiments of the present invention.

FIG. 1 shows a portion of a vehicle 10, which, as explained in more detail below, includes a control system capable of implementing a method in accordance with embodiments of the present invention. The vehicle 10 includes an engine 12 and an electric machine 14, which can operate as a motor to output torque and as a generator to receive torque and output electrical energy. Disposed between the engine 12 and the motor 14 is a disconnect clutch 16 and two hydraulic pumps: a main transmission pump 18, and an auxiliary pump 20. The pump 18 is a mechanical pump connected to and powered by the motor 14, whereas the pump 20 is powered by one or both of a low-voltage battery 22 or a high voltage battery 24 outputting lower voltage power through a DC/DC converter 26. The pumps 18, 20 provide hydraulic output to operate the disconnect clutch 16 as well as a torque-converter bypass clutch 28, which works in conjunction with a torque converter 30. A transmission gearbox 32 receives the output from the torque converter 30, and provides an output to final drive gearing 34, which provides torque to or receives torque from vehicle drive wheels 36, 38.

Figure 2:
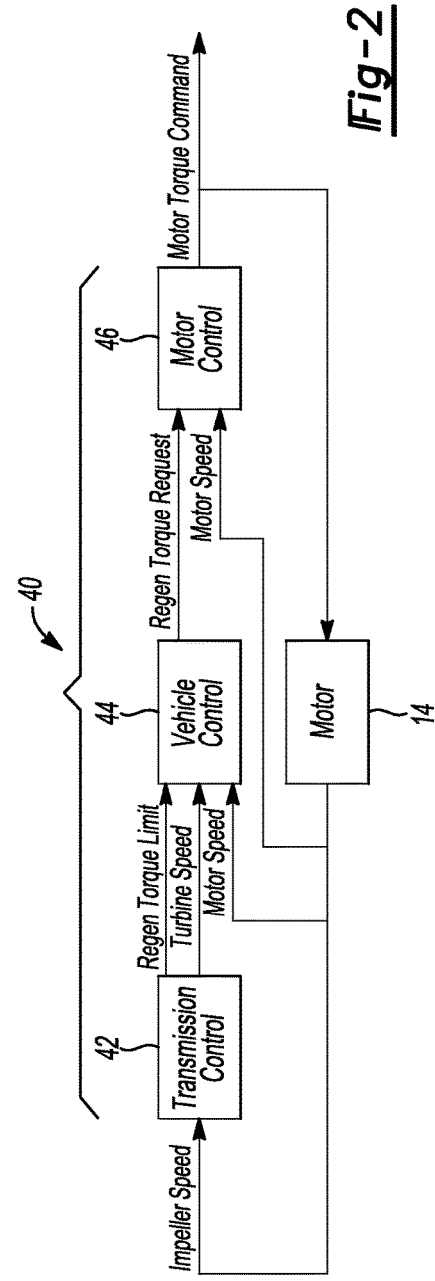
FIG. 2 is a schematic representation of a control system architecture in accordance with embodiments of the present invention.

FIG. 2 shows a schematic representation of a control system 40 in accordance with embodiments of the present invention. As illustrated in FIG. 2, the control system 40 includes at least three different types of controllers: one for transmission control 42, one for vehicle control 44 and one for motor control 46. Although they are illustrated as separate controllers, it is understood that a control system such as the control system 40 may include one or more controllers that reside in a single piece of hardware, or they may comprise separate hardware controllers, one or more of which may be connected, for example, through a controller area network. Thus, a control system in accordance with embodiments of the present invention may include a vehicle system controller (VSC), a powertrain control module (PCM), one or more brake control modules, battery control modules or motor controllers, other hardware or software controllers, or some combination of the foregoing.

Relating the control system 40 with the elements of the vehicle 10 shown in FIG. 1, the transmission control 42 receives as an input a speed of the impeller, which is at the input 48 of the torque converter 30. The transmission control 42 estimates a capacity of the torque-converter clutch (TCC) 28. As readily discernible from FIG. 1, the input 48 to the torque converter 30 not only represents the speed of the torque-converter impeller, but also the speed of the motor 14. The capacity of the TCC 28 is a measure of how much torque the clutch 28 can transfer. It is variable, and depends on whether the clutch is locked, slipping, open or in a transition between states. The transmission control 42 calculates and outputs a regenerative-braking torque limit ("regen torque limit") based on the capacity of the TCC 28, but may also consider the impeller speed, and if the speed of the motor 14 drops below a minimum motor speed, the regenerative-braking torque limit may be set to zero. The minimum motor speed represents a speed below which it may be undesirable to have the motor operate during a regenerative braking event. In at least some embodiments the minimum motor speed may be set to 300 revolutions per minute (RPM) although it may be more or less than 300 RPM, as desired.

Figure 3:
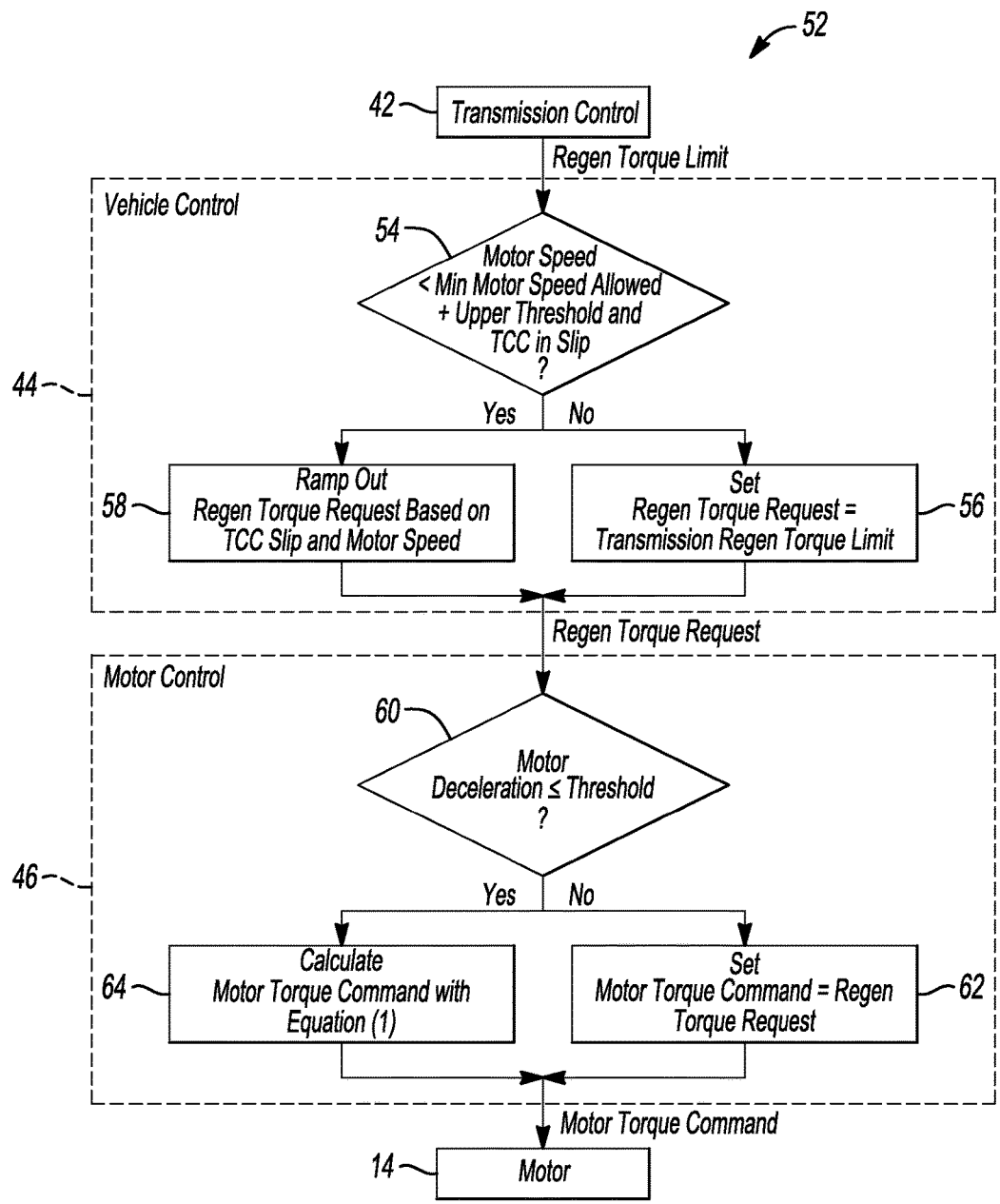
FIG. 3 is a flowchart illustrating a control system and method in accordance with embodiments of the present invention.

In addition to the regenerative-braking torque limit, a turbine speed is also output from the transmission control 42; the turbine speed is an output 50 of the torque converter 30, and represents an input into the gearbox 32. Turning to FIG. 3, a flowchart 52 illustrates a method in accordance with embodiments of the present invention, which may be implemented by a control system and controllers, such as the control system 40 shown in FIG. 2. The flowchart 52 has three distinct regions; the transmission control 42, the vehicle control 44 and the motor control 46. As already described, the transmission control 42 outputs a regenerative-braking torque limit to the vehicle control 44.

At decision block 54, the speed of the motor 14 is compared to a first predetermined speed, which in this embodiment is a minimum motor speed—such as the minimum motor speed described above—plus some upper threshold value. In at least some embodiments, the upper threshold value may be 100-200 RPM. In the case where the minimum motor speed is 300 RPM, the first predetermined speed may be in the range of 400-500 RPM. Also at decision block 54, the state of the TCC 28 is analyzed to see if it is currently slipping. If the motor speed is not less than the minimum motor speed plus the upper threshold—i.e., the first predetermined speed—or the TCC slip is below a predetermined slip, then the method moves to step 56.

The amount of slip in the TCC 28 may be determined, for example, by calculating a difference between a speed of the impeller at the input 48 and a speed of the turbine at the output 50—see FIG. 1. Therefore, as the amount of slip in the TCC 28 increases, the difference between the input and output speeds also increases. Because slip in a clutch, such as the TCC 28, may be dependent upon various factors such as transmission oil temperature, the current transmission gear, impeller speed and input torque, just to name a few, the predetermined slip may be defined as an array of values in a lookup table so that an appropriate predetermined slip value may be chosen based on one or more of the aforementioned parameters. In some embodiments, and under some sets of conditions, the predetermined slip value may be in the range of 50-100 RPM.

At step 56, a regenerative-braking torque request is set equal to the regenerative-braking torque limit previously set by the transmission control 42 ("trans regen limit"). Thus, at least some embodiments of the present invention include the step of implementing a regenerative-braking torque request based at least in part on the speed of the motor and the slip of the TCC, such as the motor 14 and the TCC 28. If at decision block 54 it is determined that the speed of the motor 14 is less than the minimum motor speed plus the upper threshold value, and the slip in the TCC 28 is more than the predetermined slip, then the method moves to step 58.

At step 58, the regenerative-braking torque request is reduced to zero based at least in part on the TCC slip and motor speed. As described above with regard to decision block 54, the method does not even reach step 58 without the analysis of motor speed and TCC slip; however, once the method reaches step 58, the way in which the regenerative-braking torque request is reduced to zero—i.e. "ramped-out"—is further dependent upon the motor speed and the slip. This is described and illustrated in more detail in conjunction with FIG. 4. Another way of considering the regenerative-braking torque request being ramped-out is that the vehicle control 44 is controlling regenerative braking such that regenerative braking is reduced to zero when the motor speed and TCC slip meet the criteria set forth in decision block 54.

The method illustrated in the flowchart 52 may be implemented by a control system within a vehicle at some predetermined frequency, for example, every 10 milliseconds, or at some other predetermined frequency. Therefore, the first time it is implemented, an initial value of a regenerative-braking torque request may be chosen for purposes of implementing step 58. For example, the regenerative-braking torque limit or some other value may be used as the initial regenerative-braking torque request for purposes of reducing the regenerative braking to zero in accordance with step 58.

Whether the regenerative-braking torque request is set equal to the regenerative-braking torque limit as shown in step 56, or whether it is being ramped out in accordance with step 58, the vehicle control 44 outputs the regenerative-braking torque request to the motor control 46. The motor control 46 starts by examining a deceleration of the motor 14 ($\dot{\omega}_m$), and specifically, it is determined at decision block 60 whether the motor deceleration is less than or equal to a threshold, or predetermined deceleration, which may be a minimum allowable motor deceleration ($\dot{\omega}_{m\ min}$). In at least some embodiments, the predetermined deceleration may have a value of 3500 RPM per second. As explained in more detail below, the determination at decision block 60 will help define a motor torque command which will be sent to the motor 14 as part of the regenerative-braking control of the illustrated embodiment.

If it is determined at decision block 60 that deceleration of the motor 14 is not less than or equal to the threshold value—i.e., it is not less than or equal to the predetermined deceleration—then the method moves to step 62. At step 62 the motor torque command is set equal to the regenerative-braking torque request received from the vehicle control 44. If, however, it is determined at decision block 60 that the motor deceleration is less than or equal to the threshold value, then the method moves to step 64 where the motor torque command ($\tau_m$) is calculated in accordance with Equation (1)—see below.

$$\tau_m = \begin{cases} Tq_{regenReq}, & \omega_m > \omega_{m_{min}} \\ \max\left(-\left|\frac{d\tau_{min}}{dt}\right|_{max}\left|\frac{(\omega_m - \omega_{m\ min})}{\omega_n}\right|, Tq_{regenReq}\right) & \omega_m <= \omega_{m\ min} \end{cases} \quad (1)$$

Where:

$$\omega_m, \omega_{m\ min}, \dot{\omega}_m, \left|\frac{d\tau_m}{dt}\right|_{max}$$

are motor speed, minimum motor speed, motor deceleration, and the maximum possible rate of change of the motor torque, respectively. The maximum motor torque change rate $$\left(\left|\frac{d\tau_m}{dt}\right|_{max}\right)$$

is a hardware-dependent value; that is, it may be specified by a motor manufacturer, and may have different values for different motors. For some motors, this value may be at or near 5000 Newton-meters per second (Nm/s).

As readily seen from Equation (1), the upper portion of the equation is addressed at step 62 in the flowchart 52 in FIG. 3. Specifically, where the motor deceleration ($\dot{\omega}_m$) is greater than the minimum motor deceleration ($\dot{\omega}_{m\ min}$), the motor torque command ($\tau_m$) is set equal to the regenerative-braking torque request, which is labeled "regen torque request" in step 62, and is labeled "Tq$_{regenReq}$" in Equation (1). The lower portion of Equation (1) is addressed at step 64 in the flowchart 52, and is used when the motor deceleration ($\dot{\omega}_m$) is less than or equal to the minimum motor deceleration ($\dot{\omega}_{m\ min}$). This part of Equation (1) uses a maximum function to determine the motor torque command.

The first term of the lower portion of Equation (1)—that is, $$-\left|\frac{d\tau_m}{dt}\right|_{max}\left|\frac{(\omega_m - \omega_{m\ min})}{\dot{\omega}_m}\right|$$

—will likely be the larger term when the motor deceleration ($\dot{\omega}_m$) is high and the motor speed ($\omega_m$) is very close to the minimum motor speed ($\omega_{min\ m}$). Because this term is always negative, however, the regenerative-braking torque request (Tq$_{regenReq}$) will be the larger term when it is equal to zero. In general then, a motor torque command in accordance with at least some embodiments may be based at least in part on one or more of the following: a motor deceleration, a motor speed, a minimum motor speed, a motor speed difference—e.g., the difference between the motor speed and the minimum motor speed—a maximum motor-torque change rate, or a regenerative-braking torque request.

Regardless of the result of the arbitration applied in Equation (1), the output is a motor torque command, which is sent to the motor 14 as part of the step of controlling the torque of the motor 14. This is also illustrated in FIG. 2, where the motor torque command is output from the motor control 46 to the motor 14, and then is fed back into the motor control 46 as the steps shown in the flowchart 52 are repeated. An output from the motor 14 is the motor speed, or impeller speed, which is fed back into both the transmission control 42 and the vehicle control 44.

Figure 4:
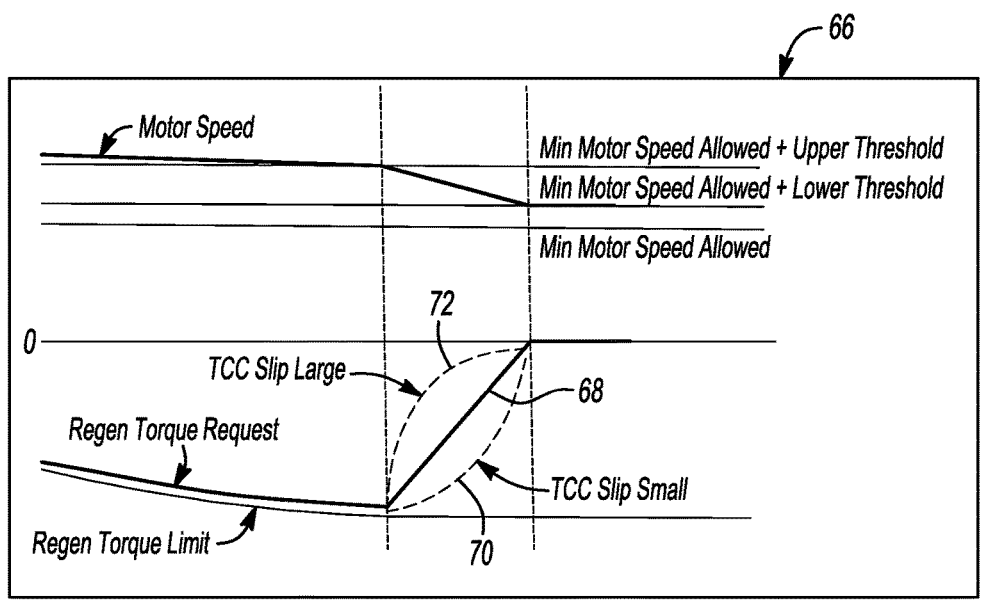
FIG. 4 is a graph illustrating one form of regenerative braking control in accordance with embodiments of the present invention.

As described above, the vehicle control 44 includes the step of ramping-out the regenerative-braking torque request as shown in step 58. The graph 66 shown in FIG. 4 illustrates an example of how this ramping-out may occur in at least some embodiments. On the left side of the graph 66, the motor speed is above the first predetermined speed, which as described above is in this embodiment the minimum motor speed plus the upper threshold value. When the motor 14 is being operated above this speed, the method is at step 56 where the regenerative-braking torque request is set equal to the regenerative-braking torque limit. This is also illustrated in the graph 66, and although the regenerative-braking torque request line is illustrated as just above the regenerative-braking torque limit line, this is done for clarity; in practice the two lines would be coincident.

Once the motor speed reaches the level of the minimum motor speed plus the upper threshold value, the regenerative-braking torque request begins to be reduced to zero in accordance with step 58. As shown in the graph 66, the regenerative-braking torque request may be ramped-out at any of a number of different rates. For example, the ramping-out may occur linearly as illustrated by the line segment 68. Alternatively, the rate at which the regenerative braking is reduced to zero may be based on an amount of slip in the TCC 28. Specifically, where there is only a small amount of slip, the initial ramping-out may occur very gradually with the slope increasing near the point at which the regenerative braking reaches zero; this is illustrated by the curve 70 in FIG. 4. Conversely, where the slip in the TCC 28 is large, the ramping-out may occur initially very quickly, only tapering off near the end of the ramping-out; this is illustrated by the curve 72 in FIG. 4.

As the motor speed continues to drop, the regenerative-braking torque request is reduced to zero as described above. In at least some embodiments, the regenerative braking can be controlled such that it reaches zero at a particular motor speed. In the embodiment illustrated in FIG. 4, the regenerative-braking torque request is controlled such that it equals zero when the speed of the motor 14 reaches a second predetermined speed. As shown in the graph 66, the second predetermined speed is equal to the minimum motor speed plus a lower threshold value. As described above, the minimum motor speed may be in some embodiments approximately 300 RPM; similarly, the lower threshold value in some embodiments may be in the range of 0-50 RPM. Therefore, in the embodiment illustrated in FIG. 4, the second predetermined speed may be in the range of 300-350 RPM. As noted above, a control system implementing methods described above may do so continuously at some predetermined frequency throughout a braking event, thereby allowing an adaptive control of the regenerative braking for the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling regenerative braking in a vehicle having an electric motor and a torque-converter clutch, comprising:
    reducing regenerative braking to zero when a speed of the motor is below a first predetermined speed and a slip of the torque-converter clutch is more than a predetermined slip; and
    controlling a torque of the motor based at least in part on a deceleration of the motor.

2. The method of claim 1, wherein a rate of reducing the regenerative braking to zero is based on an amount of slip in the torque-converter clutch.

3. The method of claim 2, wherein the first predetermined speed is based on a minimum motor speed and an upper threshold value.

4. The method of claim 3, wherein the regenerative braking is reduced to zero such that the regenerative braking reaches zero when the speed of the motor reaches a second predetermined speed.

5. The method of claim 4, wherein the second predetermined speed is based on the minimum motor speed and a lower threshold value.

6. The method of claim 1, further comprising setting a regenerative-braking torque request equal to a regenerative-braking torque limit when the speed of the motor is at or above the first predetermined speed or the slip of the torque-converter clutch is at or below the predetermined slip.

7. The method of claim 1, wherein controlling the torque of the motor includes sending to the motor a motor torque command equal to a regenerative-braking torque request when the deceleration of the motor is above a predetermined deceleration.

8. The method of claim 7, wherein the motor torque command is based at least in part on a maximum motor-torque change rate when the deceleration of the motor is at or below the predetermined deceleration.

9. The method of claim 8, wherein the motor torque command is further based at least in part on a speed of the motor and a minimum motor speed when the deceleration of the motor is at or below the predetermined deceleration.

10. A method for controlling regenerative braking in a vehicle having an electric motor and a torque-converter clutch, comprising:
implementing a regenerative-braking torque request based at least in part on a speed of the motor and a slip of the torque-converter clutch; and
sending to the motor a motor torque command based at least in part on a deceleration of the motor.

11. The method of claim 10, wherein the regenerative-braking torque request is set equal to a regenerative-braking torque limit when the speed of the motor is at or above a first predetermined speed or the slip of the torque-converter clutch is at or below a predetermined slip.

12. The method of claim 10, wherein the regenerative-braking torque request is reduced to zero when the speed of the motor is below a first predetermined speed and the slip of the torque-converter clutch is more than a predetermined slip.

13. The method of claim 12, wherein a rate of change in the regenerative-braking torque request as the regenerative-braking torque request is reduced to zero is based on an amount of slip in the torque-converter clutch.

14. The method of claim 12, wherein the first predetermined speed is based on a minimum motor speed and an upper threshold value.

15. The method of claim 14, wherein the regenerative-braking torque request is controlled such that it reaches zero when the speed of the motor reaches a second predetermined speed.

16. The method of claim 15, wherein the second predetermined speed is based on the minimum motor speed and a lower threshold value.

17. The method of claim 10, wherein the motor torque command is set equal to the regenerative-braking torque request when the deceleration of the motor is above a predetermined deceleration.

18. The method of claim 17, wherein the motor torque command is further based at least in part on a maximum motor-torque change rate when the deceleration of the motor is at or below the predetermined deceleration.

19. The method of claim 18, wherein the motor torque command is further based at least in part on a speed of the motor and a minimum motor speed when the deceleration of the motor is at or below the predetermined deceleration.

20. A system for controlling regenerative braking in a vehicle having an electric motor and a torque-converter clutch, comprising:
a control system including at least one controller configured to control regenerative braking based at least in part on a speed of the motor and a slip of the torque-converter clutch, and to control a torque of the motor based at least in part on a deceleration of the motor.

21. The system of claim 20, wherein the at least one controller is configured to control regenerative braking by setting a regenerative-braking torque request equal to a regenerative-braking torque limit when the speed of the motor is at or above a first predetermined speed or the slip of the torque-converter clutch is at or below a predetermined slip.

22. The system of claim 21, wherein the at least one controller is further configured to reduce the regenerative-braking torque request to zero when the speed of the motor is below the first predetermined speed and the slip of the torque-converter clutch is more than the predetermined slip.

23. The system of claim 20, wherein the at least one controller is further configured to control the torque of the motor by sending to the motor a motor torque command equal to a regenerative-braking torque request when the deceleration of the motor is above a predetermined deceleration.

24. The system of claim 23, wherein the at least one controller is further configured to control the torque of the motor by basing the motor torque command at least in part on a maximum motor-torque change rate when the deceleration of the motor is at or below the predetermined deceleration.

25. The system of claim 23, wherein the at least one controller is further configured to control the torque of the motor by basing the motor torque command at least in part on a speed of the motor and a minimum motor speed when the deceleration of the motor is at or below the predetermined deceleration.

* * * * *